United States Patent
Ishikawa

(10) Patent No.: US 11,482,749 B2
(45) Date of Patent: Oct. 25, 2022

(54) STACK FRAME

(71) Applicant: TOYOTA JIDOSHA KABUSHIKI KAISHA, Toyota (JP)

(72) Inventor: Daisuke Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 416 days.

(21) Appl. No.: 16/694,151

(22) Filed: Nov. 25, 2019

(65) Prior Publication Data
US 2020/0185673 A1    Jun. 11, 2020

(30) Foreign Application Priority Data

Dec. 11, 2018  (JP) .............................. JP2018-231652

(51) Int. Cl.
| | |
|---|---|
| *H01M 4/02* | (2006.01) |
| *H01M 50/20* | (2021.01) |
| *B60L 50/60* | (2019.01) |

(52) U.S. Cl.
CPC ............. *H01M 50/20* (2021.01); *B60L 50/66* (2019.02)

(58) Field of Classification Search
CPC ...................................................... H01M 4/02
See application file for complete search history.

(56) References Cited

U.S. PATENT DOCUMENTS

| | | | |
|---|---|---|---|
| 2015/0162639 A1* | 6/2015 | Lee ................... | H01M 10/0413 29/592.1 |
| 2018/0178641 A1 | 6/2018 | Yamafuji et al. | |

FOREIGN PATENT DOCUMENTS

| | | |
|---|---|---|
| CN | 107742683 A | 2/2018 |
| JP | 2018-103783 | 7/2018 |

* cited by examiner

*Primary Examiner* — Jacob B Marks
(74) *Attorney, Agent, or Firm* — Finnegan, Henderson, Farabow, Garrett & Dunner, LLP

(57) ABSTRACT

A stack frame is mounted with a battery stack, and is installed in a vehicle. The stack frame includes: a plurality of frame members arranged in a right-left direction of the vehicle; and a cross member extending in the right-left direction of the vehicle and joined to all end surfaces of the plurality of frame members. An end frame member located at least at one end in the right-left direction of the plurality of frame members, includes: an end surface covered region having an end surface covered with the cross member; and an end surface exposed region having an exposed end surface, and the end surface covered region is provided with more mounting holes used for mounting the battery stack than the end surface exposed region.

3 Claims, 6 Drawing Sheets

FIG. 3
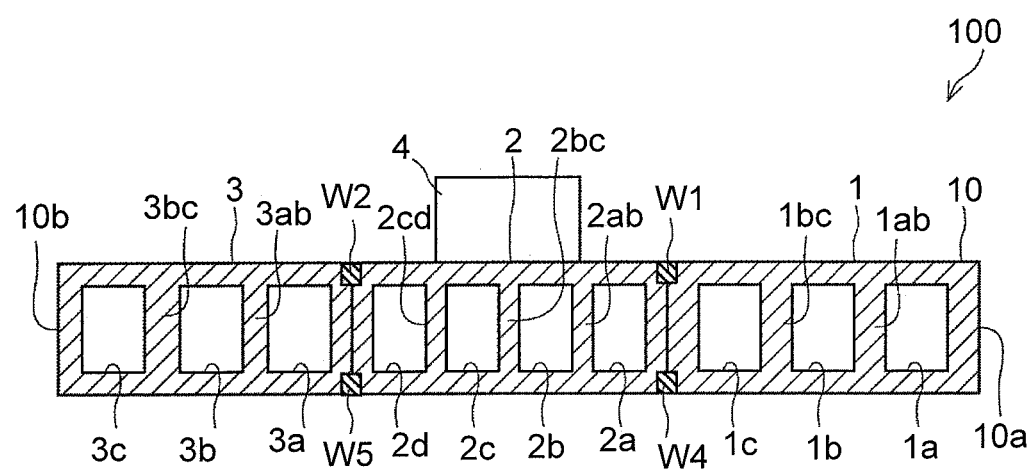
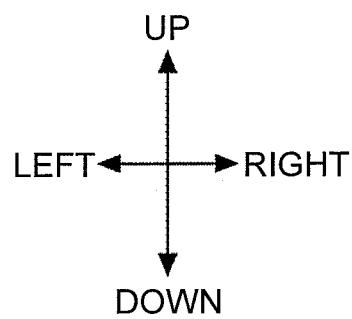

STACK FRAME

INCORPORATION BY REFERENCE

The disclosure of Japanese Patent Application No. 2018-231652 filed on Dec. 11, 2018 including the specification, drawings and abstract is incorporated herein by reference in its entirety.

BACKGROUND

1. Technical Field

The present disclosure relates to a stack frame, and more particularly, to a stack frame having mounting holes used for mounting a battery stack.

2. Description of Related Art

Japanese Patent Application Publication No. 2018-103783 discloses a stack frame that is disposed in a front part of a vehicle and mounted with a battery stack.

SUMMARY

The inventors of the present application have found the following problems regarding the above-described technique. As a manufacturing method for a stack frame, there are a molding method using integral molding and a manufacturing method including a joining process of joining a plurality of molded products. The stack frame is required to have a predetermined dimension. Therefore, a manufacturing method including a joining process of joining a plurality of molded products tends to be lower in cost than in a molding method using integral molding. Therefore, stack frames are often manufactured by using a manufacturing method including a joining step of joining a plurality of molded products.

A stack frame is formed with a plurality of mounting holes used for mounting a battery stack. When a manufacturing method including a joining step of joining a plurality of molded products is employed, a plurality of mounting holes are often provided at four corners of the stack frame. It is difficult to provide the plurality of mounting holes to only one of the molded products, and the plurality of mounting holes are often provided to the plurality of molded products.

A battery stack has a heavy weight. Hence, when a vehicle equipped with a stack frame mounted with a battery stack travels on a rough road, great vibration is generated. Due to occurrence of the vibration, there may be a possibility that the mounting holes receive force, which makes it difficult to ensure fixing strength for fixing the battery stack.

The inventors of the present application have conceived to provide reinforcement using a cross member as a plurality of molded products. However, the shape and dimension of the stack frame have certain restrictions depending on the space in the vehicle and the peripheral equipment around the stack frame. Specifically, there may be such a restriction that a cross member shorter than the total width of the plurality of molded products should be used.

An object of the present disclosure is to provide a stack frame capable of ensuring fixing strength for fixing a battery stack while satisfying restrictions on the shape and dimension.

A stack frame according to the present disclosure is a stack frame mounted with a battery stack and installed in a vehicle, the stack frame includes: a plurality of frame members arranged in a right-left direction of the vehicle; and a cross member extending in the right-left direction of the vehicle and joined to all end surfaces of the plurality of frame members, an end frame member located at least at one end in the right-left direction, of the plurality of frame members, includes: an end surface covered region having an end surface covered with the cross member; and an end surface exposed region having an exposed end surface, and the end surface covered region being provided with more mounting holes used for mounting the battery stack than the end surface exposed region.

According to this configuration, the end surface of the end frame member located in the end surface covered region is joined to the cross member. More mounting holes are provided in the end surface covered region than in the end surface exposed region. Hence, vibration caused by the battery stack can be more easily transmitted to the cross member via the mounting holes. Accordingly, force applied to the mounting holes is reduced, to thus ensure fixing strength for fixing the battery stack.

A center of gravity of a figure formed by connecting all the mounting holes may be located in the end surface covered region.

According to this configuration, vibration caused by the battery stack can be easily transmitted to the cross member via the mounting holes. Accordingly, force applied to the mounting holes is reduced, to thus ensure fixing strength for fixing the battery stack.

A stack frame according to the present disclosure is a stack frame mounted with a battery stack and installed in a vehicle, the stack frame includes: a plurality of frame members arranged in a right-left direction of the vehicle; and a cross member extending in the right-left direction of the vehicle and joined to all end surfaces of the plurality of frame members, an end frame member located at least at one end in the right-left direction, of the plurality of frame members, includes: an end surface covered region having an end surface covered with the cross member; and an end surface exposed region having an exposed end surface, both of the end surface covered region and the end surface exposed region are provided with the same number of mounting holes used for mounting the battery stack, and a center of gravity of a figure formed by connecting all the mounting holes is located in the end surface covered region.

According to this configuration, the end surface of the end frame member located in the end surface covered region is joined to the cross member. More mounting holes are provided in the end surface covered region than in the end surface exposed region. Hence, vibration caused by the battery stack can be easily transmitted to the cross member via the mounting holes. Accordingly, force applied to the mounting holes is reduced, to thus ensure fixing strength for fixing the battery stack.

The present disclosure can ensure fixing strength for fixing the battery stack while satisfying the restrictions on the shape and dimension.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a sectional view showing the stack frame according to the first embodiment;

DETAILED DESCRIPTION OF EMBODIMENTS

Hereinafter, specific embodiments to which the present disclosure is applied will be described in detail with reference to the drawings. However, the present disclosure is not limited to the following embodiments. Note that, for clarification of explanation, the following description and drawings will be simplified as appropriate.

First Embodiment

Figure 1:
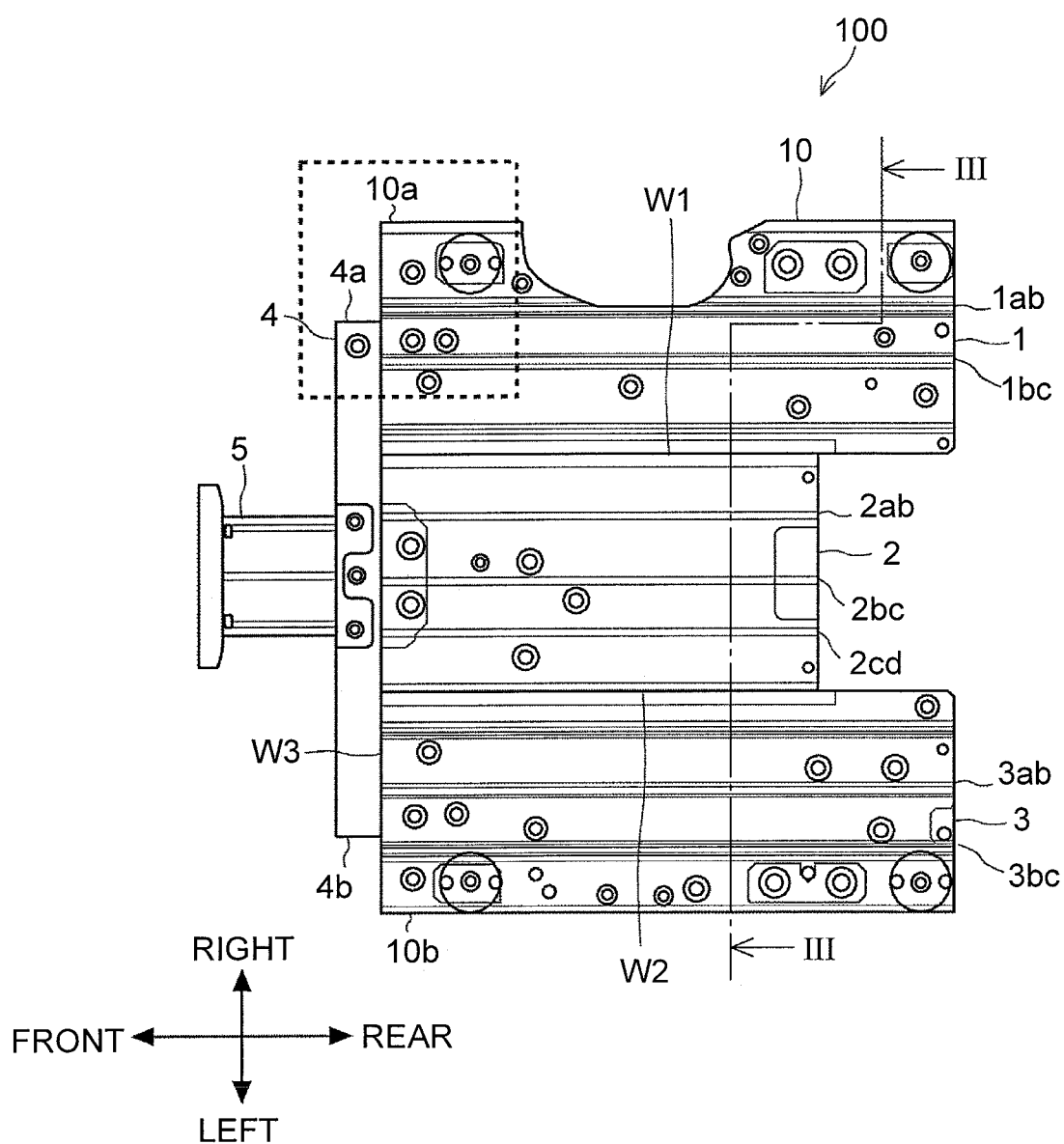
FIG. 1 is a top view of a stack frame according to a first embodiment.
Figure 2:
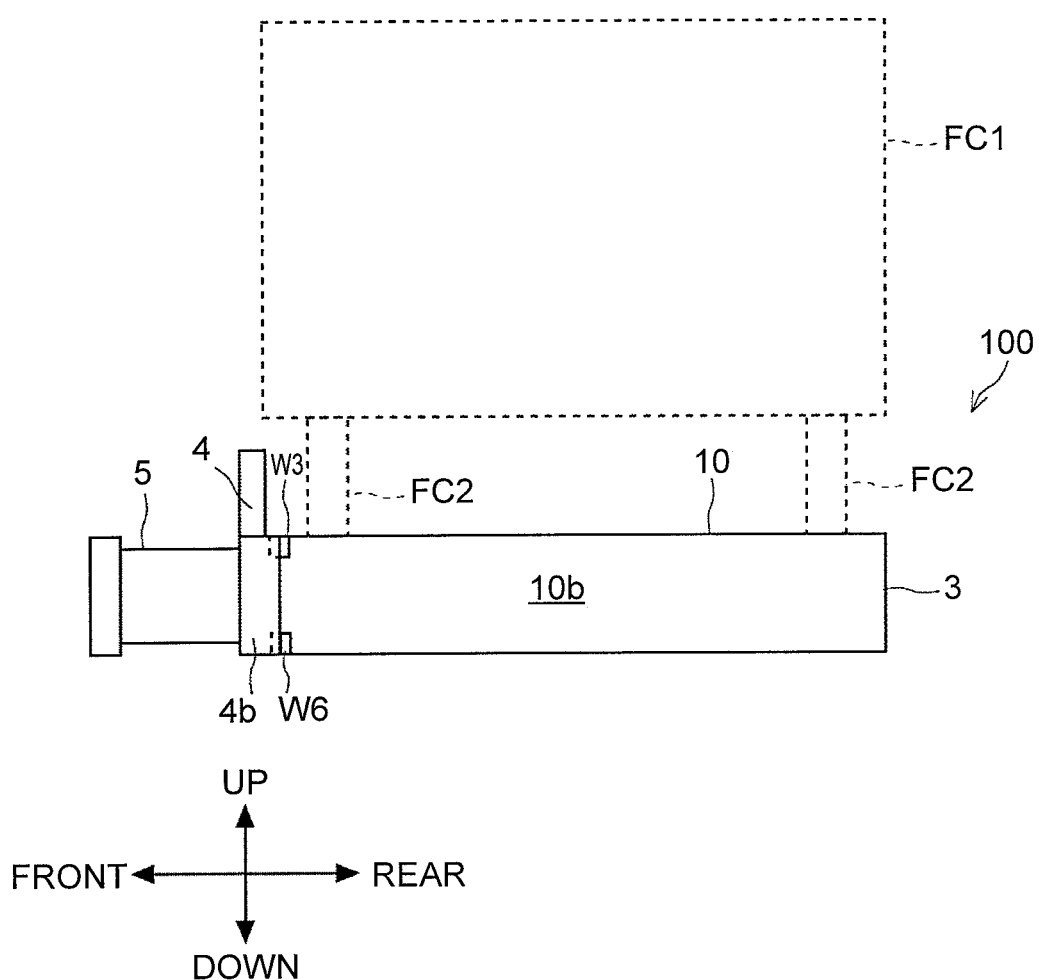
FIG. 2 is a left side view showing the stack frame according to the first embodiment.
Figure 4:
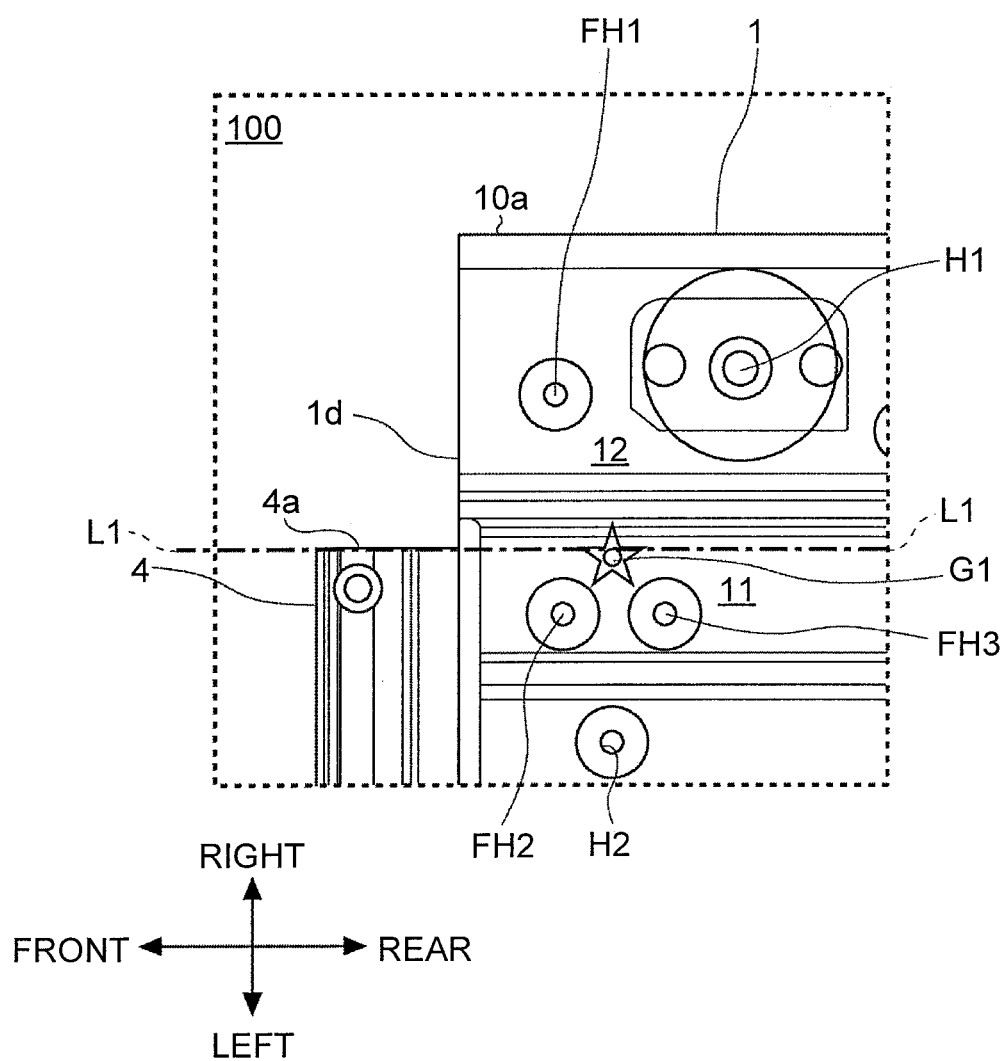
FIG. 4 is an enlarged view of an upper surface of the stack frame according to the first embodiment.

A stack frame according to the first embodiment will be described with reference to FIG. 1 to FIG. 4. FIG. 1 is a top view of the stack frame according to the first embodiment. FIG. 2 is a left side view showing the stack frame according to the first embodiment. FIG. 3 is a sectional view showing the stack frame according to the first embodiment. FIG. 4 is an enlarged view of an upper surface of the stack frame according to the first embodiment.

As a matter of course, three-dimensional orthogonal coordinates shown in FIG. 1 and the other drawings indicate the up-down direction, the right-left direction, and the front-rear direction, respectively, and they are used for convenient for explaining the positional relationship of components. FIG. 1 is a view of the stack frame 100 as viewed from above the stack frame 100. FIG. 2 is a view of the stack frame 100 shown in FIG. 1 as viewed from the left side the stack frame 100. FIG. 3 shows a cross-section of the stack frame 100 shown in FIG. 1. FIG. 4 shows a part of the stack frame 100 shown in FIG. 1 in an enlarged manner.

The stack frame 100 is disposed in a front part of a vehicle (not shown), specifically, in an engine compartment. The up-down direction, the right-left direction, and the front-rear direction shown in FIG. 1 and the other drawings correspond to the up-down direction, the right-left direction, and the front-rear direction of the vehicle, respectively.

As shown in FIG. 1, the stack frame 100 includes a main body 10 and a crash box 5.

As shown in FIG. 2, the main body 10 can be mounted with a fuel cell stack FC1 via supports FC2. The main body 10 may be provided with four supports FC2. Specifically, one support FC2 may be disposed at each of four corners of the main body 10. The main body 10 can be mounted with a cell stack of a rechargeable battery via the supports FC2. The rechargeable battery is, for example, a lithium ion battery, or the like.

The main body 10 includes a right member 1, a central member 2, and a left member 3 (each, also referred to as a frame member). The right member 1, the central member 2, and the left member 3 are arranged in this order from the right side to the left side. The right member 1 and the left member 3 sandwich the central member 2 between the right member 1 and the left member 3. The right member 1 is disposed at a right end in the right-left direction, and the left member 3 is disposed at a left end in the right-left direction. The right member 1, the central member 2, and the left member 3 may be plate-like bodies, specifically extruded members made of an aluminum alloy. As shown in FIG. 1 and FIG. 3, the right member 1 and the central member 2 are joined to each other by FSW (friction stir welding) along joint lines W1 and W4, and the central member 2 and the left member 3 are joined to each other by FSW along joint lines W2 and W5. The joining between the right member 1 and the central member 2 and the joining between the central member 2 and the left member 3 may be performed by welding, for example, friction stir welding.

In addition, various joining methods can be used for the joining between the right member 1 and the central member 2, and the joining between the central member 2 and the left member 3. Examples of other joining methods may include welding, such as laser welding and arc welding.

As shown in FIG. 3, the right member 1 includes hollow portions 1a, 1b, 1c and ribs 1ab, 1bc that extend in the front-rear direction. The hollow portions 1a, 1b, 1c are arranged from the right to the left. The rib lab separates the hollow portion 1a and the hollow portion 1b from each other, and the rib 1bc separates the hollow portion 1b and the hollow portion 1c from each other.

The central member 2 includes hollow portions 2a, 2b, 2c, 2d and ribs 2ab, 2bc, 2cd that extend in the front-rear direction. The hollow portions 2a, 2b, 2c, 2d are arranged from the right to the left. The rib 2ab separates the hollow portion 2a and the hollow portion 2b from each other, and the rib 2bc separates the hollow portion 2b and the hollow portion 2c from each other. The rib 2cd separates the hollow portion 2c and the hollow portion 2d from each other.

The left member 3 includes hollow portions 3a, 3b, 3c and ribs 3ab, 3bc that extend in the front-rear direction. The hollow portions 3a, 3b, 3c are arranged from the right to the left. The rib 3ab separates the hollow portion 3a and the hollow portion 3b from each other, and the rib 3bc separates the hollow portion 3b and the hollow portion 3c from each other.

In addition, although the right member 1, the central member 2, and the left member 3 are provided with the hollow portions and the ribs, they may be plate-shaped bodies with no hollow portions.

The crash box 5 is attached to a front end of the main body 10 via the cross member 4. Therefore, the crash box 5 is disposed in the front part of the vehicle. The crash box 5 is a cylindrical body having a square cross section, for example.

As the cross member 4, any rod-shaped body extending in the right-left direction may be employed. The cross member 4 is joined to the right member 1, the central member 2, and the left member 3 along the joint lines W3, W6. That is, the cross member 4 is joined to all front end surfaces of the right member 1, the central member 2, and the left member 3. The joint line W6 is located below the joint line W3 and overlaps the joint line W3 as viewed from above the stack frame 100. An advancing direction of the joint line W6 coincides with an advancing direction of the joint line W3 as viewed from above the stack frame 100. The joining of the cross member 4 relative to the right member 1, the central member 2, and the left member 3 may be carried out by welding such as friction stir welding. Note that the joining may be carried out along the joint lines W1, W4, W2, W5, W3, W6 in this order.

In the cross member 4, a right end 4a of the cross member 4 is positioned at or near the rib lab, and a left end 4b of the cross member 4 is positioned at or near the rib 3bc. In this case, a right end 10a of the right member 1 or an end surface in the vicinity of the right end 10a, and a left end 10b of the left member 3 or an end surface in the vicinity of the left end 10b are exposed. Therefore, this is preferable because an arrangement space for peripheral equipment around the stack frame 100 in an overall shape of the vehicle or in the vehicle becomes larger.

The right end 4a of the cross member 4 is located in the middle between the joint line W1 relative to the right member 1 and the right end 10a. Further, the left end 4b of the cross member 4 is located in the middle between the joint line W2 relative to the left member 3 and the left end 10b.

The crash box 5 is more easily deformed when receiving an impact than the main body 10 is, and thus absorbs impact energy.

As shown in FIG. 4, a front part of the right member 1 of the stack frame 100 is formed with three mounting holes FH1, FH2, FH3. The mounting holes FH1, FH2, FH3 are used for mounting a battery stack such as the fuel cell stack FC1 to the stack frame 100 via the supports FC2 shown in FIG. 2. For other purposes, the front part of the right member 1 of the stack frame 100 may be formed with holes H1, H2, etc.

The right member 1 includes an end surface covered region 11 and an end surface exposed region 12. The end surface covered region 11 is a region of the right member 1 where the end surface 1d of the right member 1 is covered with the cross member 4. The end surface exposed region 12 is a region of the right member 1 where the end surface 1d is not covered with the cross member 4. In other words, the end surface exposed region 12 is a region where the end surface 1d is exposed.

Specifically, the end surface covered region 11 and the end surface exposed region 12 shown in FIG. 4 are separated by a boundary line L1. The boundary line L1 is a straight line that passes through the right end 4a and extends in the front-rear direction of the vehicle. The end surface covered region 11 is a region that extends from the boundary line L1 to the left side, that is, the central member 2 side shown in FIG. 1. The end surface exposed region 12 is a region that extends from the boundary line L1 to the right side, that is, to the right end 10a side. The end surface covered region 11 can be considered to be generally closer to the cross member 4 than the end surface exposed region 12 is.

The mounting holes FH2, FH3 are disposed in the end surface covered region 11, and the mounting hole FH1 is disposed in the end surface exposed region 12. There are two mounting holes FH2, FH3 in the end surface covered region 11 and one mounting hole FH1 in the end surface exposed region 12. That is, the number of mounting holes FH2, FH3 disposed in the end surface covered region 11 is more than that of the mounting holes FH1 disposed in the end surface exposed region 12.

A center of gravity G1 of a triangle formed by connecting the mounting holes FH1, FH2, FH3 is located in the end surface covered region 11.

Here, the stack frame 100 in a state of being mounted with the fuel cell stack FC1 or the cell stack of the rechargeable battery greatly vibrates. For example, this happens when a vehicle (not shown) equipped with the stack frame 100, which is mounted with the fuel cell stack FC1 and others, travels on a rough road. Vibration caused by the fuel cell stack FC1 and others is easily transmitted to the cross member 4 through the mounting holes FH1, FH2, FH3. The number of the mounting holes FH2, FH3 disposed in the end surface covered region 11 is larger than that of the mounting hole FH1 disposed in the end surface exposed region 12. Therefore, a majority of the mounting holes, which are the mounting holes FH2 and FH3, are provided in the vicinity of the cross member 4. Hence, particularly, the mounting holes FH2, FH3 transmit the vibration to the cross member 4. As a result, the force applied to the mounting holes FH1, FH2, FH3 is reduced, and thus the fixing strength for fixing the fuel cell stack FC1 or the cell stack of the rechargeable battery can be ensured.

Further, in the stack frame 100, the center of gravity G1 is located in the end surface covered region 11. The mounting holes FH1, FH2, FH3 are provided in the right member 1 according to a predetermined rule, and this can be considered that these mounting holes are generally closer to the cross member 4. Therefore, the vibration caused by the fuel cell stack FC1 and others is more easily transmitted to the cross member 4 through the mounting holes FH1, FH2, FH3. Therefore, the fixing strength for fixing the fuel cell stack FC1 or the cell stack of the rechargeable battery can be further ensured.

In an example of the stack frame 100 shown in FIG. 4, the number of mounting holes is three, but the number of mounting holes may be four or more. More mounting holes may be disposed in the end surface covered region 11 than in the end surface exposed region 12. Since a majority of the mounting holes are provided in the vicinity of the cross member 4, the above vibration is particularly easily transmitted to the cross member 4. Therefore, the force applied to the mounting holes is reduced, and the fixing strength for fixing the fuel cell stack FC1 or the cell stack of the rechargeable battery can be ensured.

Further, the right end 4a of the cross member 4 is located in the middle between the joint line W1 relative to the right member 1 and the right end 10a. Therefore, this is preferable because an arrangement space for peripheral equipment around the stack frame 100 in an overall shape of the vehicle or in the vehicle becomes larger. That is, the stack frame 100 satisfies the restrictions on a predetermined shape and dimension.

The mounting holes having the same configuration as that of the mounting holes FH1, FH2, FH3 may be provided at different four corners of the stack frame 100, specifically, at front and rear positions of the left member 3, and at rear positions of the right member 1. When the mounting holes having the same configuration as the mounting holes FH1, FH2, FH3 are provided on the rear side of the left member 3 or the rear side of the right member 1, a cross member having the same configuration as that of the cross member 4 may be joined to all the rear end surfaces of the right member 1, the central member 2 and the left member 3. The rear end surface of the central member 2 may be substantially flush with the rear end surfaces of the right member 1 and the left member 3.

As described above, according to the configuration of the stack frame 100, it is possible to ensure the fixing strength for fixing the fuel cell stack FC1 or the cell stack of the rechargeable battery while satisfying the restrictions on the shape and dimension.

EXAMPLE OF MODIFICATION

Figure 5:
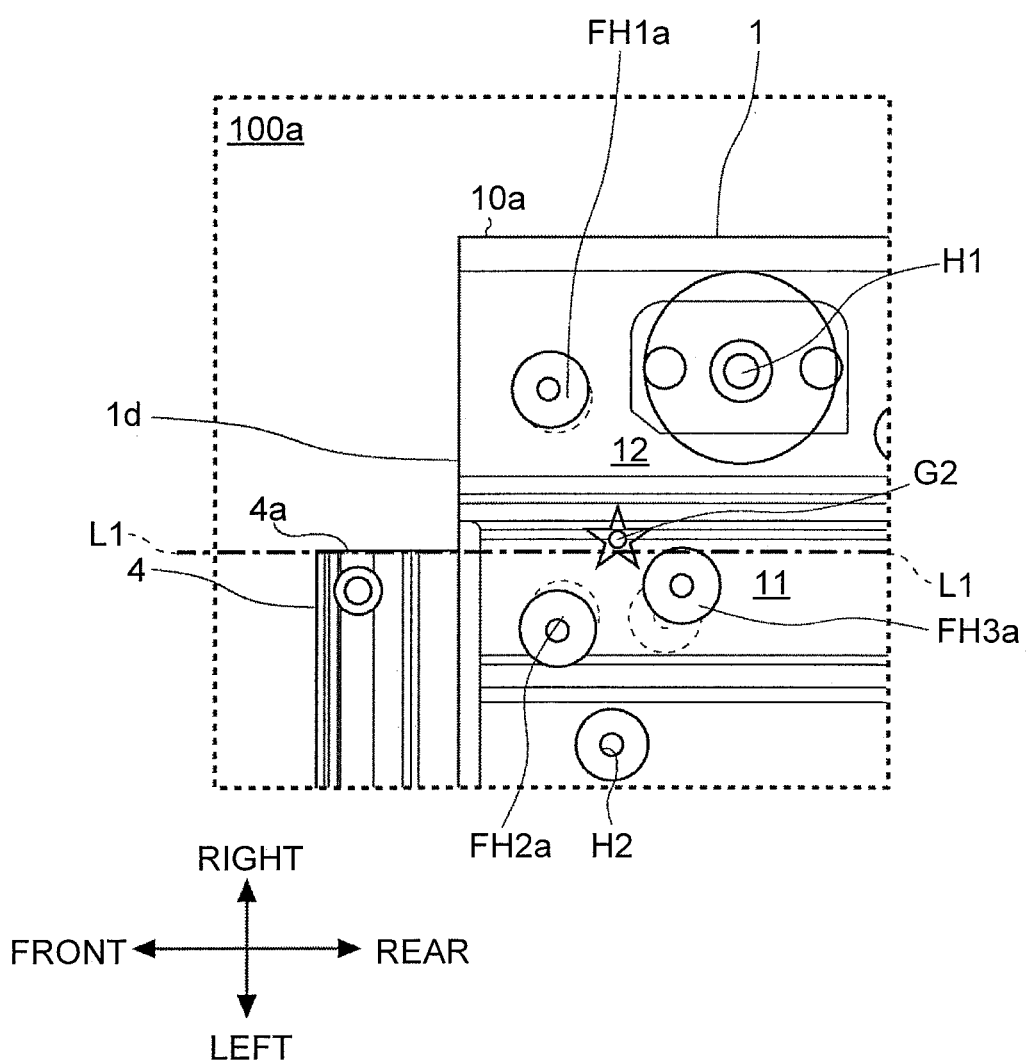
FIG. 5 is an enlarged view of an upper surface of an example of a modification of the stack frame according to the first embodiment.

There is a stack frame 100a shown in FIG. 5. FIG. 5 is an enlarged view of an upper surface of an example of a modification of the stack frame according to the first embodiment. The stack frame 100a is an example of the modification of the stack frame 100 shown in FIG. 1 to FIG. 4. The stack frame 100a has the same configuration as that of the stack frame 100 except for the positions of the mounting holes FH1, FH2, FH3.

As shown in FIG. 5, the mounting holes FH1a, FH2a, FH3a are located at different locations from the mounting holes FH1, FH2, FH3 of the stack frame 100 shown in FIG.

4, respectively. Specifically, the mounting hole FH1a is located closer to the right end 10a of the main body 10 than the mounting hole FH1 is. The mounting hole FH2a is located at a position more leftward than the mounting hole FH2. The mounting hole FH3a is located closer to the right end 10a of the main body 10 than the mounting hole FH3 is. However, similarly, the mounting holes FH2a, FH3a are disposed in the end surface covered region 11, and the mounting hole FH1a is disposed in the end surface exposed region 12. There are two mounting holes FH2a, FH3a in the end surface covered region 11, and one mounting hole FH1a in the end surface exposed region 12. That is, more of the mounting holes FH1a, FH2a, FH3a are disposed in the end surface covered region 11 than in the end surface exposed region 12.

A center of gravity G2 of a triangle formed by connecting the mounting holes FH1a, FH2a, FH3a is located in the end surface exposed region 12.

As described above, according to the configuration of the stack frame 100a, as with the stack frame 100, while satisfying the restrictions on the shape and dimension, the fixing strength for fixing the fuel cell stack FC1 or the cell stack of the rechargeable battery can be ensured.

The center of gravity G2 is located in the end surface exposed region 12, and the center of gravity G1 shown in FIG. 4 is located in the end surface covered region 11. Therefore, in the stack frame 100 shown in FIG. 4, as compared with the stack frame 100a, it can be considered that the mounting holes are generally closer to the cross member 4. Therefore, the fixing strength for fixing the fuel cell stack FC1 or the cell stack of the rechargeable battery can be ensured more reliably.

Second Embodiment

Figure 6:
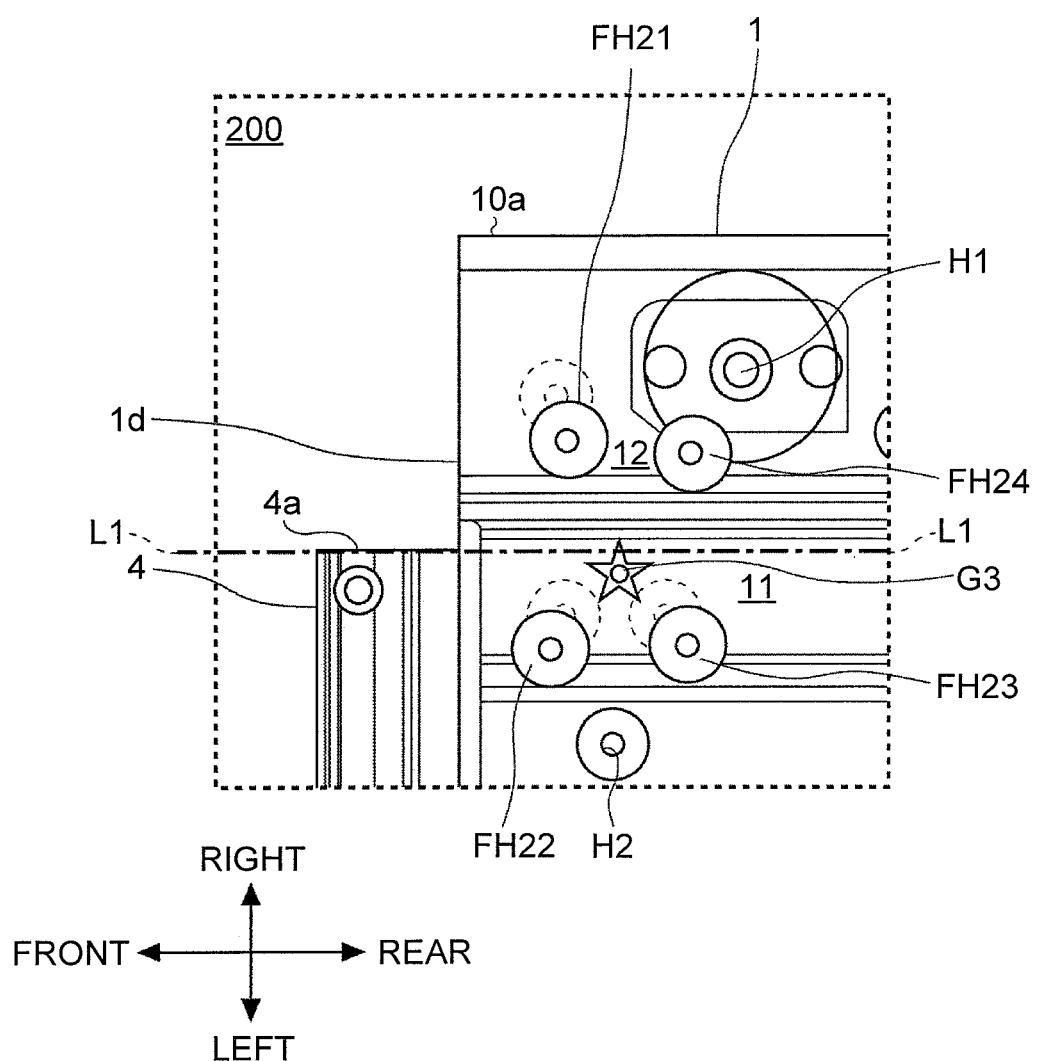
FIG. 6 is an enlarged view of an upper surface of a stack frame according to a second embodiment.

A stack frame according to the second embodiment will be described with reference to FIG. 6. FIG. 6 is an enlarged view of an upper surface of a stack frame according to the second embodiment. The stack frame according to the second embodiment has the same configuration as those of the stack frames 100, 100a except for the positions and the number of the mounting hole FH1 and others.

As shown in FIG. 6, the stack frame 200 includes mounting holes FH21, FH22, FH23, FH24. The mounting holes FH21, FH22, FH23 are located at different locations from those of the mounting holes FH1, FH2, FH3 of the stack frame 100 shown in FIG. 4. The mounting hole FH21 is located more leftward than the mounting hole FH1. The mounting hole FH22 is located more leftward than the mounting hole FH2. The mounting hole FH23 is located more leftward in the main body 10 than the mounting hole FH3.

The mounting holes FH22, FH23 are disposed in the end surface covered region 11, and the mounting holes FH21, FH24 are disposed in the end surface exposed region 12. There are two mounting holes FH22, FH23 in the end surface covered region 11 and two mounting holes FH21, FH24 in the end surface exposed region 12. That is, the number of mounting holes FH22, FH23 disposed in the end surface covered region 11 is the same as the number of mounting holes FH21, FH24 disposed in the end surface exposed region 12.

A center of gravity G3 of a square formed by connecting the mounting holes FH21, FH22, FH23, FH24 is located in the end surface covered region 11.

Here, the stack frame 200 in a state of being mounted with the fuel cell stack FC1 or the cell stack of the rechargeable battery greatly vibrates. For example, this happens when a vehicle (not shown) equipped with the stack frame 200, which is mounted with the fuel cell stack FC1 shown in FIG. 2, travels on a rough road. Vibration caused by the fuel cell stack FC1 and others is easily transmitted to the cross member 4 through the mounting holes FH21, FH22, FH23, FH24. The mounting holes FH22, FH23 disposed in the end surface covered region 11 are the same number as that of the mounting holes FH21, FH24 disposed in the end surface exposed region 12. The center of gravity G3 is located in the end surface covered region 11. Therefore, the mounting holes FH21, FH22, FH23, FH24 are provided in the right member 1 according to a predetermined rule, and this can be considered that these mounting holes are generally closer to the cross member 4. Hence, particularly, the mounting holes FH21, FH22, FH23, FH24 further transmit the vibration to the cross member 4. As a result, the force applied to the mounting holes FH21, FH22, FH23, FH24 is reduced, and the fixing strength for fixing the fuel cell stack FC1 or the cell stack of the rechargeable battery can be ensured.

Further, as with the stack frame 100 shown in FIG. 1, the right end 4a of the cross member 4 is located in the middle between the joint line W1 relative to the right member 1 and the right end 10a. Therefore, this is preferable because an arrangement space for peripheral equipment around the stack frame 100 in an overall shape of the vehicle or in the vehicle becomes larger. That is, the stack frame 200 satisfies the restrictions on a predetermined shape and dimension.

As described above, according to the configuration of the stack frame 200, it is possible to ensure the fixing strength for fixing the fuel cell stack FC1 or the cell stack of the rechargeable battery while satisfying the restrictions on a predetermined shape and dimension.

In the example of the stack frame 200 shown in FIG. 6 described above, the number of mounting holes is four, but may be two or more. The same number of mounting holes such as the mounting hole FH21 and others is provided in the end surface covered region 11 and the end surface exposed region 12. The center of gravity of a figure formed by connecting the mounting holes such as the mounting hole FH21 and others may be located in the end surface covered region 11. The mounting holes are provided in the right member 1 according to a predetermined rule, and this can be considered that these mounting holes are generally closer to the cross member 4. Therefore, particularly, the mounting holes further transmit the above vibration to the cross member 4. As a result, the force applied to the mounting holes is reduced, and the fixing strength for fixing the fuel cell stack FC1 or the cell stack of the rechargeable battery can be ensured.

The mounting holes having the same configuration as that of the mounting holes FH21, FH22, FH23, FH24 may be provided at different four corners of the stack frame 200, specifically, at front and rear positions of the left member 3, and at rear positions of the right member 1. When the mounting holes having the same configuration as that of the mounting holes FH21, FH22, FH23, FH24 are provided at rear positions of the left member 3 or rear positions of the right member 1, a cross member having a configuration identical to the configuration of the cross member 4 may be joined to all the rear end surfaces of the right member 1, the central member 2, and the left member 3. The rear end surface of the central member 2 may be substantially flush with the rear end surfaces of the right member 1 and the left member 3.

Note that the present disclosure is not limited to the above-described embodiments, and can be changed as appropriate without departing from the spirit of the present disclosure.

What is claimed is:

1. A stack frame mounted with a battery stack and installed in a vehicle,
the stack frame comprising: a plurality of frame members arranged in a right-left direction of the vehicle; and a cross member extending in the right-left direction of the vehicle and joined to all end surfaces of the plurality of frame members, with the cross member being shorter in length than the total width of all of the plurality of frame members in the right-left direction,
an end frame member located at least at one end in the right-left direction, of the plurality of frame members, including: an end surface covered region having an end surface covered with the cross member, and an end surface exposed region having an exposed end surface that extends beyond an end of the cross member and is not covered by the cross member,
the end surface covered region being provided with more mounting holes used for mounting the battery stack than the end surface exposed region.

2. The stack frame according to claim 1, wherein a center of gravity of a figure formed by connecting all the mounting holes is located in the end surface covered region.

3. A stack frame mounted with a battery stack and installed in a vehicle,
the stack frame comprising: a plurality of frame members arranged in a right-left direction of the vehicle; and a cross member extending in the right-left direction of the vehicle and joined to all end surfaces of the plurality of frame members, with the cross member being shorter in length than the total width of all of the plurality of frame members in the right-left direction,
an end frame member located at least at one end in the right-left direction, of the plurality of frame members, including: an end surface covered region having an end surface covered with the cross member, and an end surface exposed region having an exposed end surface that extends beyond an end of the cross member and is not covered by the cross member,
both of the end surface covered region and the end surface exposed region being provided with the same number of mounting holes used for mounting the battery stack, and
a center of gravity of a figure formed by connecting all the mounting holes being located in the end surface covered region.

* * * * *